United States Patent [19]

Webster et al.

[11] 4,233,545
[45] Nov. 11, 1980

[54] AUTOMATIC LIGHTING CONTROL SYSTEM

[76] Inventors: Lee R. Webster; Gary J. Woods, both of 1670 Highway A1A, Satellite Beach, Fla. 32937

[21] Appl. No.: 942,977

[22] Filed: Sep. 18, 1978

[51] Int. Cl.² .................................. H01J 40/14
[52] U.S. Cl. .................... 250/214 AL; 315/154
[58] Field of Search ............ 250/214 R, 214 AL, 210; 315/153, 154, 156, 151

[56] References Cited

U.S. PATENT DOCUMENTS 4,122,334  10/1978  Owens .................. 250/214 R

Primary Examiner—David C. Nelms
Assistant Examiner—Darwin R. Hostetter

Attorney, Agent, or Firm—Richard D. Dixon

[57] ABSTRACT

This invention relates to an automatic lighting control system which employs a photosensitive detector in one leg of a bridge circuit for sensing the total effective level of both the natural and artificial illumination within an interior space. The unbalanced output of the bridge is fed into a pair of differential comparators for deriving a digital error signal representative of the level of illumination falling outside an acceptable range. A digital error signal is loaded into an intermediate shift register responsive to a clock signal. If an error signal of the type requiring a change in illumination is present, then a subsequent clock pulse will command a shift register to add or interrupt power to one or more lighting modules which supply artificial illumination to the interior space.

13 Claims, 4 Drawing Figures

FIG. 1

LOGIC TABLE

FIG. 4

|  | 49 | 59 |  |
|---|---|---|---|
| $V_1 > V_2$ | 0 | 0 |  |
| $V_1 \leq V_2$ | 1 | 0 | ↓ ONLY |
| $V_1 \geq V_2$ | 0 | 1 | ↑ ONLY |
| $V_1 < V_2$ | 1 | 1 |  |

AUTOMATIC LIGHTING CONTROL SYSTEM

BACKGROUND OF THE INVENTION

I. Field of the Invention

The present invention relates to a lighting control system for controlling the intensity of artificial illumination in order to automatically supplement natural illumination present in an area of concern. The total level of illumination is generally maintained constant, and the level of this constant illumination may be adjusted.

II. Description of the Prior Art

Fluorescent lighting fixtures and incandescent lighting fixtures are generally used for providing artificial illumination within modern office buildings. Architectural and economic limitations on the construction of new commercial buildings generally dictate that the office space include a suspended ceiling or false ceiling which includes suspended lighting fixtures, generally of the fluorescent type. The space between the suspended ceiling and the actual ceiling is generally reserved for ducting for air-conditioning and heating as well as electrical service for the lighting fixtures. The lighting fixtures are generally arranged in modular forms, with each of the illumination modules being independently controlled by a power switch. These power switches generally are of the on-off variety which merely remove power from the lights when the illuminated area is no longer in use by the occupants thereof. Continuously variable lighting controls are not frequently utilized by architects and building designers since they are aware that the occupants of the building will infrequently adjust the level of illumination, such as only once or twice per day in response to the sun being obscured by continuous layers of clouds, smog, fog, etc. The occupants of the office area generally will not devote the time and effort to continuously adjust the level of artificial illumination responsive to the sun being infrequently obscured for short periods of time by clouds, etc.

Most modern office buildings have modular lighting systems in which one switch controls from between 1,000 to 1,600 watts of artificial illumination coupled to a 110 volt or 277 volt 60-cycle source of electrical power. Careful design and layout of the office area can define these illumination modules into areas which generally receive similar amounts of natural sunlight, such as through windows, skylights, etc. If areas receiving similar amounts of natural illumination are defined, then it may be possible to sense the level of natural illumination and use the artificial illumination only to supplement the natural illumination in order to maintain a relatively constant illumination over the area at all times. In this manner areas relatively close to outward facing windows may require little additional illumination, while areas substantially separated from outwardly facing windows may require nearly continuous illumination. Office areas having no exposure to natural illumination would of course not benefit from the presence of an automatic control circuit, since the control circuit would maintain a constant level of illumination.

The present invention will be discussed assuming that modern lighting system techniques are utilized in the design of the typical office area. One example of these modern techniques are discussed in U.S. Pat. No. 4,001,571, issued to Martin. However, various other circuit branches or modular design techniques may be utilized without departing from the spirit and scope of the present system.

Denger, in U.S. Pat. No. 3,458,770, discloses an automatic lighting control system for use with controlling the exposure of photosensitive paper. The system includes a bridge circuit having a photocell therein, with the output of the photocell being adjustable so as to interrupt the flow of electrical energy to an artificial source of illumination. The power is applied to the artificial source of illumination when the level of illumination falls below a single desired point, while power is interrupted when the level of illumination exceeds the predetermined level. An integrating circuit is utilized to equalize variations in illumination produced by the artificial source over an extended period of time.

Dubot, in U.S. Pat. No. 3,961,183, discloses a photosensitive detector which is utilized in a simple voltage divider for sensing the relative level of illumination incident upon an area of interest. The non-bridged output of the photo-detector is coupled to the input of an analog circuit which in turn controls the supply of electrical energy to a single direction electrical motor. The motor sequentially closes switch contacts for coupling electrical energy to artificial illuminators. This system does not provide a tolerance interval over which the level of artificial illumination is acceptable, and apparently the motor can be driven only in a single direction.

Fisher, in U.S. Pat. No. 2,920,247, discloses a circuit utilizing a tube-type multivibrator which is driven into oscillation by the incidence of light upon a photosensitive detector coupled to the grids thereof. As the multivibrator begins to oscillate, the output power from the multivibrator is utilized to control the passage of electrical energy through a control relay, such as the type which may be utilized to supply electrical energy to the headlights of an automobile.

Long, in U.S. Pat. No. 2,078,677, discloses an artificial lighting display apparatus which is actuated when the level of natural light falls below a predetermined limit. As the device is actuated, the light sensor gradually illuminates and then gradually reduces the illumination from an artificial source of light of one color, and then periodically provides electrical energy to other colored sources of artificial illumination so as to artificially illuminate a subject area with periodically varying intensities of different colored lights. The intensity of the artificial illumination is controlled by placing resistance bars in series with the sources of illumination, thereby resulting in a very inefficient use of the electrical energy provided from the source.

Krenke, in U.S. Pat. No. 3,210,611, discloses an electrooptical control circuit which is designed to control the flow of electrical energy to an artificial source of illumination responsive to the long-time averaging of the ambient or incident light as opposed to transient light changes. The time delay circuit eliminates changes in the flow of electrical energy to the source of artificial illumination responsive to rapid lighting fluctuations such as would be exhibited by the passage of a cloud in front of the sun. This electrical system does not provide for a dead zone or zone of acceptable lighting intensity, but instead automatically supplies electrical energy to the source of illumination if the ambient illumination falls below a predetermined limit for a selected period of time.

Mas, in U.S. Pat. No. 3,180,978, discloses an illumination system which includes a wall-mounted window having a source of artificial illumination emanating from behind the normal ceiling-mounted illumination. An outside photosensor detects the intensity of external illumination and correspondingly adjusts the backlighting on the artificial window to produce similar lighting for the room, thereby simulating the normal variations in the intensities of natural lighting. The electrical control circuit may also be coupled to the overhead lights for supplying power thereto when the external natural illumination falls below a predetermined limit. This system controls internal illumination responsive to external illumination, but does not control the artificial illumination so as to supplement external natural illumination.

Del Zotto, in U.S. Pat. No. 3,629,649, discloses a photodiode comprising one leg of a resistance bridge, with the intensity of illumination incident upon the photodiode controlling the operation of a latching relay which supplies electrical power to artificial sources of illumination. This system does not control the intensity of the artificial illumination, but merely turns the source of artificial illumination on and off.

Crozier, in U.S. Pat. No. 3,878,439, discloses a phototransistor which is coupled to a Schmidt trigger acting as a threshold detector for supplying electrical energy to a relay which in turn couples a load to a source of electrical energy. A timing circuit is provided for starting the operation of the relay when the phototransistor changes from an illuminated condition to a non-illuminated condition, or vice versa.

Bolhuis, in U.S. Pat. No. 3,863,104, discloses a lighting control system for being utilized with at least two groups of electrically powered lamps, such as those utilized in transportation tunnels. Each of the groups of lamps is independently controlled, but not responsive to a level of ambient illumination.

Charles, in U.S. Pat. No. 3,767,924, discloses an electrical make and break switch for use in controlling the lighting in a modern office building or school responsive to signals from a computer. Independent control of the lights is obtained through the computer and also from local stations by the utilization of photosensitive detectors at the local stations. McCabe, in U.S. Pat. No. 3,249,805, discloses a signal controlled rectifier (or silicon controlled rectifier-SCR) of the type which could be used for controlling the flow of electrical energy to a load.

Reference is also made to a device in a pending United States patent application in the name of the National Aeronautics and Space Administration which includes a bidirectional mechanical motor which actuates serial switches for sequentially applying electrical energy to artificial sources of illumination. This device includes a plurality of mercury switches which are located about the circumference of a circular plate. The plate is rotated by the motor in steps responsive to the level of illumination incident upon a photocell. This patent application was filed on Dec. 23, 1976, and accorded the Ser. No. 753,977.

These prior art references are illustrative of the many similar references located generally in the following classes/subclasses of U.S. Patent Office: 362/1, 20, 85, 147; 361/173, 174, 175, 197; 250/214 AL, 239; 307/116,117, 124,132 T, 311; 315/151, 153, 156, 158, 159, 149, 150, 152, 155, and others.

The prior art also includes various existing designs which utilize a 555 timer having the inputs thereof shorted until the level of illumination crosses an unacceptable threshold limit. The inputs are then coupled to an R-C network having the appropriate time constant for determining the timing period. If at anytime during the timing period the level of illumination recrosses the illumination threshold, then the inputs of the clock timer are again shorted to ground. One limitation of this design appears when the voltage across the R-C network exceeds approximately 38 percent of the trigger voltage for the 555 device. Under these circumstances the noise impulse created by shorting the R-C network to ground generally will trigger the 555 device, thereby producing a false timing pulse which typically will produce a false change in the level of artificial illumination. In contrast with this design, the present invention utilizes a continuous clock and separate sampling gates which are periodically clocked to sample the levels of illumination and responsive thereto an error signal is generated. The use of a continuous clock with periodic sampling tends to eliminate the false triggering inherent in the aforementioned prior art designs.

SUMMARY OF THE INVENTION

The present invention relates to an illumination control system for controlling the flow of electrical energy from a source thereof to a plurality of lighting modules for supplementing the natural illumination within an interior space so as to maintain a desired level of illumination. The illumination control apparatus includes a plurality of power controllers each interposed between a source of electrical energy and one of the lighting modules. A photosensitive detector is provided for sensing the natural and artificial illumination within the interior space. An illumination limit detector is coupled to the photosensitive detector for generating a digital error signal responsive to the sensed illumination deviating outside of an acceptable illumination range defined between an upper illumination limit and a lower illumination limit. Upon receiving a clock signal the error signal is fed into a shift register. The shift register then actuates a corresponding one of the power controllers so as to adjust the total level of illumination within the interior space to fall within the acceptable range.

In a first preferred embodiment, an impedance device is coupled across the error signal nodes of the bridge in order to provide mutual coupling therebetween. This coupling tends to reduce the sensitivity of the system during conditions of relatively intense illumination, while generally increasing the sensitivity of the system during lower levels of illumination.

BRIEF DESCRIPTION OF THE DRAWINGS

Other objects, features and advantages of the present invention will be apparent through a study of the written description and the drawings in which.

DETAILED DESCRIPTION OF THE PREFERRED EMBODIMENT

Figure 1:
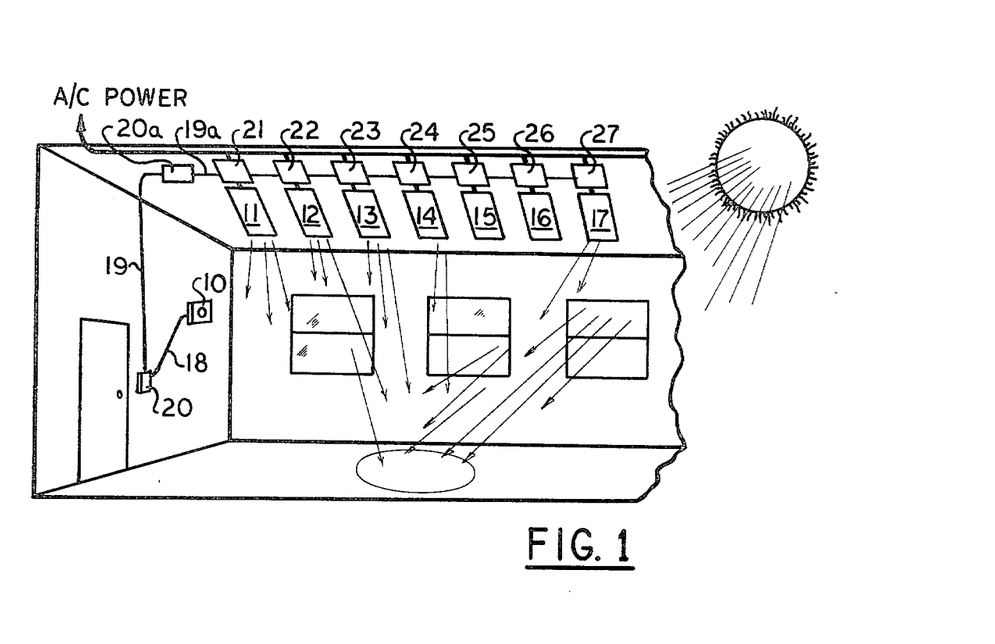
FIG. 1 is a perspective illustration of an interior room having an automatic lighting control system in accordance with the present invention installed for regulating the artificial illumination so as to supplement the illumination provided by the natural sunlight.

A first preferred embodiment of an electronic automatic lighting control system in accordance with the teachings of the present invention is shown generally in FIG. 1. The system is designed to be employed in a room having external windows through which natural sunlight may pass. The purpose of this system is to automatically supplement the variable illumination from the sun with artificial illumination, such as from incandescent or fluorescent light sources.

As illustrated in FIG. 1, a photosensitive detector, shown generally as 10, is mounted at a location within the interior section of the room so as to view a relatively wide angle section of the room. The photosensitive detector 10 will sense the combination of the natural sunlight passing through the windows and the artificial illumination from the fluorescent lights 11, 12, 13, 14, 15, 16, etc. A signal representative of the total level of both artificial and natural illumination present within the room will be transmitted through a circuit conductor 18 to bridge an error detecting logic circuitry 20, which is typically mounted adjacent to the door leading into the room within the junction box formerly provided for conventional on/off light control switches.

The commands derived from the bridge and logic circuitry 20 are transmitted through the conductor 19 to an additional portion of the logic control system 20a which actuates, through conductor 19a, the appropriate power controllers 21, 22, 23, 24, 25, 26 and 27 which are typically mounted adjacent to corresponding ones of the fluorescent lighting modules 11, 12, 13, 14, 15, 16 and 17 for controlling the flow of electrical energy thereto. In this manner the error detecting and logic control systems 20 and 20a can activate or deactivate lighting modules so as to maintain a specified constant level of illumination within the interior space, regardless of any variation in or complete absence of natural illumination from the sun.

Figure 2:
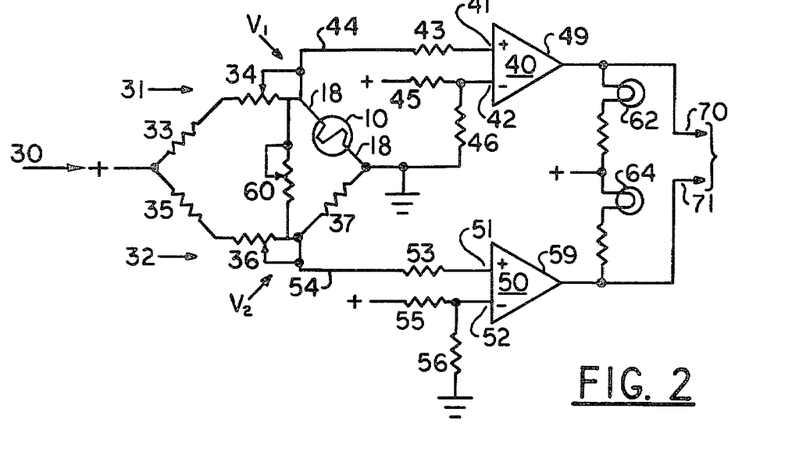
FIG. 2 illustrates a schematic diagram of bridge and control circuitry utilized in the first preferred embodiment of the present invention.

A schematic diagram of a first preferred embodiment of the bridge and control circuitry of an automatic lighting control system in accordance the present invention is shown generally in FIG. 2. The photosensitive detector 10 is illustrated as being coupled by conductor 18 in series with a potentiometer 34 and a resistor 33 so as to form one leg 31 of a bridge circuit 30. A resistor 35 is coupled in series with a potentiometer 36 and another resistor 37 so as to form another leg 32 of the bridge circuit 30. The wiper arm of the potentiometer 34 forms the first node (V1) of the bridge 30, whereas the wiper arm of the potentiometer 36 forms the node (V2) in the second leg 32 of the bridge circuit 30. A third node of the bridge 30, defined by the coupling of the photosensitive detector 10 and the resistor 37, is coupled to ground potential. A fourth node defined at the intersection of the resistors 33 and 35 is coupled to a well regulated source of positive DC potential. In this manner the voltages at the signal node, designated as V1 for the first node and V2 for the second node, will vary in accordance with the changing impedance of the photosensitive detector 10. Typically this photosensitive detector 10 comprises a model CK505, such as produced by CLAIREX Manufacturing Co., of 560 So. 3rd Ave., Mt. Vernon, N.Y., but other photosensitive detectors with responses similar to the human eye may be substituted therefore. The photosensitive detector is generally characterized as a device which displays a reduced resistance responsive to an increase in the level of incident illumination. The photosensitive detector 10 should respond equally well to both natural light from the sun and to artificial light of the type produced by incandescent, daylight fluorescent, gas discharge, etc. lights.

The first node, characterized by the wiper arm of the potentiometer 34, is coupled through an electrical conductor 44 in series with a resistor 43 to the first input 41 of a differential voltage comparator 40. A second input 42 of the voltage comparator 40 is coupled to the junction 42 between a first resistor 45 and a second resistor 46, which are coupled across a voltage of known potential to form a voltage divider network for generating a first reference potential.

In a like manner the second node, designated by the wiper arm of the potentiometer 36, is coupled through an electrical conductor 54 through a series resistor 53 to the first input 51 of a differential voltage comparator 50. A second input 52 of the differential comparator 50 is coupled to the center point of a voltage divider network comprising the resistors 55 and 56, which are coupled between a source of positive voltage potential and ground for generating a second reference potential.

Throughout the following discussion the comparator 40 will be referenced as the first voltage comparator 40 and will be assigned the function of an lower illumination limit detector, whereas the second comparator 50 will be assigned the function of a upper illumination limit detector. The resistors 45 and 46 are chosen so as to provide a lower level voltage reference at the second input 42 of the voltage comparator 40 so as to be generally equivalent to the lowest level of illumination which will bracket an acceptable range of illumination within the interior space of the room. Likewise, the resistors 55 and 56 are chosen so that the voltage input to the second input port 52 of the second voltage comparator 50 will represent the upper level or limit of the illumination in the acceptable illumination range.

The value of the resistances 33 and 34, as well as the nominal resistance or impedance of the photosensitive detector 10, are chosen such that the voltage at the first node (V1), which is coupled through the isolation resistor 43 and into the first input 41 of the first voltage comparator 40, will equal the voltage input at the second port 42 of the comparator 40 at a level of illumination incident upon the photosensitive detector 10 which is exactly equal to the lower level of desired illumination within the acceptable range. As the intensity of the illumination incident upon the photosensitive detector 10 decreases, the voltage drop across the photosensitive detector 10 will increase thereby causing the voltage level at the first port 41 of the comparator 40 to rise above the lower level reference voltage at the second port 42 thereof, which will cause an output 49 of the comparator 40 to switch from a high voltage output to a low voltage output.

Since the first input port 51 of the second voltage comparator 50 is coupled to the second node in the second leg 32 of the bridge circuit 30, one would expect that little if any voltage change would be apparent as a result of the impedance variations in the photosensitive detector 10 resulting from a change in the level of illumination thereon. However, a variable resistance, shown generally as 60, is coupled between a first node 34 and the second node 36 of the bridge circuit 30 so as to couple a portion of the voltage change across the photosensitive detector 10 into the first port 51 of the second voltage comparator 50. In this manner as the voltage across the photosensitive detector 10 decreases to a lower limit in the acceptable range, the voltage drop across the variable resistor 60 will also lower the voltage at the second node (V2), which in turn will reduce the voltage at the first port 51 of the second voltage comparator 50 until finally this voltage falls below the upper reference level voltage provided by the voltage divider comprising the resistances 55 and 56. At this time an output 59 of the second voltage comparator 50 will toggle from a low output to a high output.

From the preceeding discussion it will be apparent after careful study that the rate of change of the voltage at the first node (V1) will generally be greater than the concommitant change in the voltage level at the second node (V2). However, the mutual coupling produced by the variable resistance 60 functionally reduces the rate of change of the voltage at the first node (V1) as compared with the rate of change of the voltage at the second node (V2). This mutual coupling is important in that it counteracts the undesirable logarithmic characteristics of the photosensitive detector 10. For example, if the median illumination intensity desired in a room is 50 foot candles and the allowable variance is plus/minus 10 foot candles (making the upper limit 60 foot candles and the lower limit 40 foot candles), then the photosensitive detector 10 will be operating in a relatively sensitive region of its input-output curve-that is a given change in light intensity will produce a relatively large change in output voltage. However, if the median illumination intensity desired in a room is 100 foot candles with an allowable variance of plus/minus 10 foot candles (making the upper limit 110 foot candles and the lower limit 90 foot candles), then the photosensitive detector 10 will be operating in a relatively insensitive region of its input-output curve-that is a given change in light intensity will produce a relatively small change in output voltage. Based upon these undesirable characteristics, the mutual coupling produced by resistor 60 will increase the apparent sensitivity (measured at the output of the bridge circuit) of the photosensitive detector 10 at the higher illumination levels, while the apparent sensitivity will be decreased at the lower illumination levels. Therefore, the allowable illumination intensity about the desired or median intensity may be more linear from higher to lower median illumination intensity.

Another important function of the coupling resistor 60 may be described as follows. If the power controllers remove electrical energy from several lighting modules, then the level of artificial illumination and the total level of illumination will decrease. This decrease takes place in quantum steps which are dependent upon the total number of lighting modules and the relative number of these lighting modules which can be switched at one time. In cases involving relatively few lighting modules, the quantum decrease in illumination may cause the total level of illumination to decrease below the lower illumination limit unless the sensitivity of the system is decreased. Since the resistance 60 is variable, it may be adjusted by trained personnel so that the level of coupling between the first node and the second node will desensitize the gain of the system so that the minimum quantum decrease in illumination will not result in a total level of illumination falling below the lower illumination limit. If this coupling were not provided, then an oscillation could be established which would continuously turn on and then off again the lighting modules as the total level of illumination approximated the lower illumination limit.

The adjustment of resistors 34 and 35 are relatively independent as long as resistance 60 is at its maximum resistance value. Thus, at any one illumination intensity level, the voltage at node (V1) will increase and decrease about a relatively fixed reference point as determined by resistance 34. Likewise, the voltage at node (V2) will remain generally fixed due to the minimum mutual coupling through resistance 60 and also due to the high ratios of the resistance values utilized in the bridge circuit 30. Conversely, when one or more of the lighting modules are illuminated, the feedback will not allow the voltage output of the comparators 40 and 50 to swing outside of the upper illumination limit, which would cause oscillatory operation of the detector.

This threshold control, which utilizes both an upper and lower limit, provides a three state controller which has a range of adjustment from a maximum intensity, limited by the response of the photosensitive detector, down to a threshold illumination, which is just above the minimum intensity of response of the photosensitive detector. The photosensitive device has been selected to have the same photosensitive response characteristics as the human eye. While the particular device chosen has a logarithmic response, this response is compensated by bridge adjustment resistors 34 and 36 and also through the use of the feedback or mutual coupling resistor 60 within the bridge 30.

Figure 3:
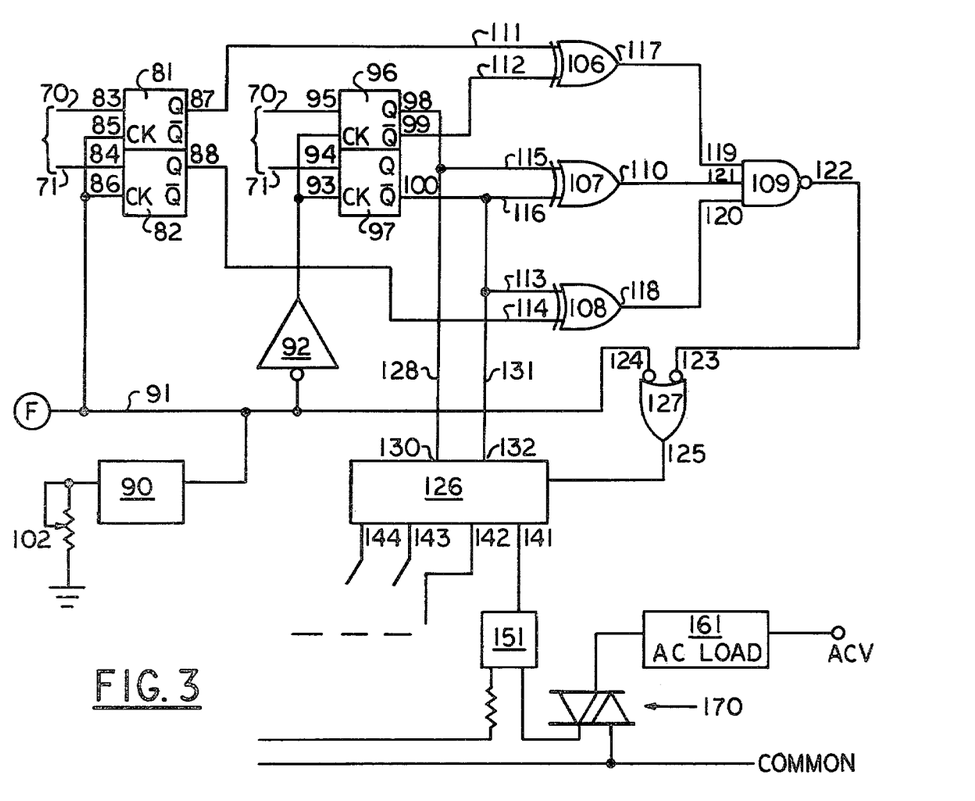
FIG. 3 illustrates a schematic diagram of the logic and power control circuitry utilized in the first preferred embodiment of the present invention.

With reference to FIGS. 2 and 3, the output 49 of the first comparator 40 is coupled through a circuit conductor 70 to a first input 83 of a first intermediate storage register 81. Likewise, the output of the second voltage comparator 50 is coupled from the output port 59 by a conductor 71 to a first input 84 of a second intermediate storage register 82. The digital values present at the outputs 49 and 59 of the first and second voltage comparators are loaded for storage into the intermediate storage registers 81 and 82 responsive to the positive edge of a clock signal generated by the clock generator 90 which is coupled through a circuit conductor 91 to second inputs 85 and 86 of the intermediate storage registers 81 and 82. The voltage levels at the outputs 87 and 88 respectively of the intermediate storage registers 81 and 82 will then be made to conform to the input levels at the instant of sampling.

With continuing reference to FIGS. 2 and 3, the output 49 of the first voltage comparator 40 is also coupled through the conductor 70 to a first input 95 of a third intermediate storage register 96. The output 59 of the second voltage comparator 50 is also coupled through the circuit conductor 71 to a first input 94 of a fourth intermediate storage register 97. The clock inputs of both the third intermediate storage register 96 and the fourth intermediate storage register 97 are coupled through a circuit conductor 93 to the output of an inverter 92, which in turn is coupled through circuit conductor 91 to the output of the variable clock 90.

The period of the variable clock 90 is adjustable for controlling the sampling period of the intermediate storage registers. Each time the output of the variable clock 90 goes positive, the first intermediate storage register 81 and the second intermediate storage register 82 are loaded with the values present at the inputs thereof. One-half cycle later on the negative edge of the output of the variable clock 90 the third intermediate storage register 96 and the fourth intermediate storage register 97 are loaded with the values present at the data inputs thereof.

The system concept of time diversity sampling is important in the process of identifying abrupt changes in illumination which occur at relatively rapid intervals and for identifying changes in illumination which are not the result of actual changes in natural light levels, such as those produced by the inclination and/or declination of the sun. Instead, these changes are integrated over a time interval selected by the adjustable potentiometer 102 which varies the period of the output signal from the variable clock 90.

The various outputs of the four intermediate storage registers 81, 82, 96 and 97 are coupled in appropriate logic sequence to various inputs of three Exclusive OR circuits (XOR) 106, 107 and 108. The operation of these XOR circuits may be most clearly illustrated by describing the desired outputs of the circuitry as a function of the inputs thereof.

Figure 4:
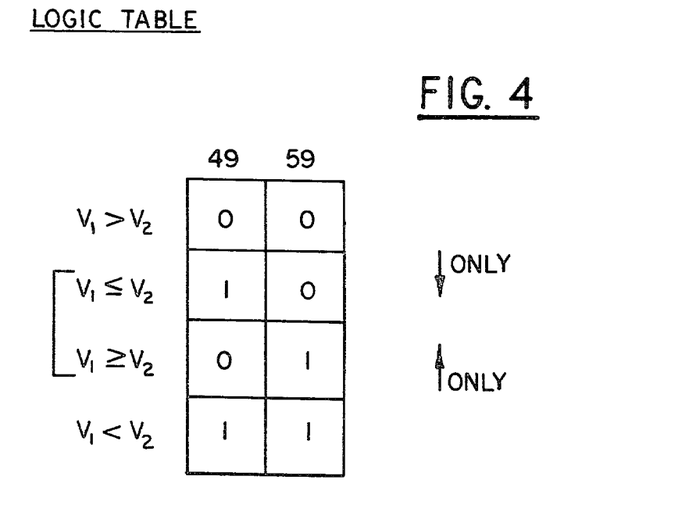
FIG. 4 provides a truth or logic table for the various combinations of desired signal outputs from the bridge and control circuitry as illustrated in FIG. 2.

After a complete positive and negative clock period, the intermediate storage registers 81, 82, 96 and 97 will be loaded with a time diversity sample representative of the levels of illumination present upon the photosensitive detector 10. The truth table for the possible outputs of the two comparators is provided in FIG. 4. If the logic contents of the intermediate storage registers 81 and 96, and 82 and 97 are the same, then the XOR circuits 106 and 108 will produce a high level signal at the respective outputs 117 and 118 thereof. From this analysis it is apparent that for the outputs 117 and 118 of the XOR circuits 106 and 108 to be high, the logic contents of each of the horizontally equivalent intermediate storage register pairs 81 and 96 and 82 and 97 must be the same. The outputs 117 and 118 of the XOR circuits 106 and 108 will not both be high for any other combination.

In a similar manner the XOR circuit 107 is connected to the outputs of the intermediate storage registers 96 and 97 in order to produce a high level signal at the output 119 thereof when the vertically related pairs of intermediate storage registers, that is 96 and 97 or 81 and 82, have the same logic levels stored therein. Since the logic contents of intermediate storage registers 96 and 97 should be the same as the logic contents of the intermediate registers 81 and 82 for normal operation of the circuitry, only the outputs of the intermediate storage registers 96 and 97 are sampled. Therefore, the output 110 of the XOR circuit 107 will be high only when the logic contents of the intermediate storage registers 96 and 97 are the same.

The outputs 117, 110 and 118 respectively of the XOR circuits 106, 107 and 108 are coupled to the three inputs of the NAND circuit 109 which operates as a "NOT-AND" detector. The output 122 of the NAND circuit 109 is coupled to one input of a NOR (not OR) circuit 110. Another input 124 of the NOR circuit 110 is coupled through circuit conductor 91 to the output of the clock 90. The function of the NAND circuit 109 and the NOR circuit 110 will be explained as follows. If for any reason two consecutive half-cycle periods of the output of the variable clock 90 elapse in which all four intermediate storage registers 81, 82, 96 and 97 are equal, then the output 122 of the NAND circuit 109 will go low. This level transition occurs because the outputs 117, 119 and 118 respectively from the XOR circuits 106, 107 and 108 will all be high. On the other hand, if the outputs 117, 119 and 118 are in any other logic conditions other than the one previously mentioned, the output 122 of the NAND circuit 109 will go high.

If the NOR circuit 127 has a low level signal at input 123, and if the input 124 includes a low level signal from the clock generator, then the output 125 of the NOR circuit 127 will go high. The output 125 of the NOR circuit 127 is coupled to the clock input of the shift register 126, and to other shift registers which also may be coupled thereto. The number of shift registers 126 will be determined by the number of outputs and the total number of lighting modules to be controlled. For the sake of clarity only one shift register 126 is illustrated in FIG. 3, and also for the sake of clarity the shift register 126 is illustrated as having only four outputs, of which only one is illustrated as being utilized. However, one skilled in the art will recognize that other shift registers and outputs may be connected in the same manner for the proper operation of this system.

Shift control ports 130 and 132 of the shift register 126 are coupled through the circuit conductors 128 and 131 respectively to the outputs 98 and 100 respectively of the intermediate storage registers 96 and 97. The logic levels apparent at the data inputs 130 and 132 of the shift register 126, upon the occurence of a clock pulse at the clock input thereof, will cause the activation or deactivation of the next sequential output of the shift register 126. The operation of such shift registers are well known in the art and will not be described in detail herein.

The various outputs 141, 142, 143 and 144 are coupled through corresponding circuit conductors to the input ports of power controllers 151, 152, etc. These power controllers are typically triac or SCR type devices. The power controller 131 is interposed in series between a source of electrical power, such as 60 Hz 110 VOLT AC commercial power, and the lighting module 161 controlled thereby. The power controllers 151, etc. typically function as electronic on-off switches for interrupting the flow of electrical power to the corresponding lighting modules 161, etc. As previously explained each of the lighting modules is arranged about the interior space of the room to be illuminated so as to be interspersed among each other and strategically located in the areas of the room which generally require the most frequent addition of artificial illumination for supplementing the natural solar illumination thereon. As plus or minus error signals or data signals are clocked into the shift register 126, the appropriate change in one or more of the outputs 141, etc. will be made so as to increment the number of illuminated lighting modules by the corresponding amount and in the proper direction. For example, if the input error signal clocked into the input ports 130 and 132 of the shift register 126 signify that one additional lighting module should be energized, the output 141, etc. representing the next significant bit in the shift register 126 will be energized and will transmit a signal over the appropriate conductor to energize the appropriate power controller 151, etc. As the power controller 151 is energized, electrical energy from the source thereof will be coupled to the lighting module 161 by turning on TRIAC 170 so as to provide an increased level of illumination.

The first preferred embodiment of the automatic lighting control system has been specifically designed in order to permit simple and economic installation for automatic control of lighting systems with existing power wiring. While other preferred embodiments may be designed for initial installation of new lighting systems, it is presently envisioned that the first preferred embodiment of the present invention is suitable for both new and existing lighting system. The installation of the automatic lighting control system will be described with specific reference to FIG. 1.

First the photosensitive detector 10 is installed in a position within the enclosed room so as to receive a typical level of natural as well as artificial illumination characteristic of the average levels of illumination throughout the room. Typically the position of the photosensitive detector would be at a point spaced from the windows of the room and also spaced from the recessed areas of the room which require constant artificial illumination. The control leads 18 from the photosensitive detector 10 are then routed to the power control box, shown generally as 20. The power control switches from the control box are then removed and the bridge circuit 30 and voltage comparators 40 and 50, together with their associated circuitry, are then installed in the power control box 20. In this manner the various adjustment potentiometers 34, 36 and 60 as well as the resistance values in the latter networks 45 and 46 as well as 55 and 56 will be available for adjustment and interchanging of parts by a skilled technician. Also, various systems of control level indicators may be mounted at the power control box 20 in order to provide a visual indication as to the relative lighting conditions within the room as compared with the upper and lower illumination levels defining the acceptable bracket of illumination within the enclosed area.

The conductors 70 and 71, coupled respectively to the outputs 49 and 59 of the voltage comparators 40 and 50, typically are connected during installation to the already existing cable conductors in the conduit 19 which were previously used to couple the lighting fixtures through the on/off switch to the main source of electrical energy. Since the source of electrical energy will be coupled directly to each of the logic subsystems, 21, 22, 23, 24, etc., which also include the corresponding power controllers 151, etc., the circuit conductors in the conduit 19 and 19a may be disconnected and used independently of the AC power source. Therefore, the appropriate power controllers may be connected directly to the appropriate artificial illumination modules, 11, 12, etc.

In the first preferred embodiment of the present invention the power controllers 21 etc. are designed to be physically attached to or adjacent to the appropriate lighting module for electrical ground continuity. Each of the power controllers may be utilized to control an entire functional group of lights, or in the alternative, multiple power controllers may be provided to control individual sources of illumination within one lighting fixture.

Installation time and expenses are minimized by utilizing existing wiring and to locate the power control circuitry immediately adjacent the lighting module to be controlled. In this manner the requirement of additional wiring and the associate labor are minimized. As illustrated in FIG. 1, the low level logic signals may be coupled between or among the various logic subsystems and power controllers through the use of low cost, low gauge wiring as opposed to the use of high cost, high voltage wiring which not only is heavy but also is difficult to handle.

The present system may be utilized to control the levels of artificial illumination in existing 110 Volt 60 Hz residential wiring system. Other embodiments of the present invention may be adapted to control higher voltage lighting systems, such as 200 to 240 Volt AC industrial of foreign systems. The utilization of a switch controller circuit breaker at the power distribution box is optional, since the main power controller can be installed or interposed at any convenient position along the main electrical conductor. Of course, the photosensitive detector, bridge circuitry and logic circuitry may be spaced from the power controllers at any conveniently accessible location.

The first preferred embodiment of the present invention may also be easily adapted for use with control wires already existing within 28 Volt AC lighting systems which utilize the 28 Volt signal to actuate relays or circuit breakers remotely located in the main power line. The use of the solid state power controllers as disclosed in the present invention would eliminate many of the costly relays and their typical reliability problems which are common in these 28 Volt control systems.

It is also envisioned that appropriate signals may be coupled to the disable inputs of the shift register, typically 126, in order to allow a central computer to be utilized for disabling the entire artificial lighting control system following the interruption of power thereto. In this manner, the load representing the artificial illumination system (approximately 60 percent of the load of a typical office environment) may be decoupled from the source of electrical energy so that the very large surge currents drawn by electrical motors and other induction type machinery may be accommodated during startup. The lighting control system will be enabled after a short delay period following the reavailability of electrical energy.

After the automatic lighting control system has been installed, the proper value of the ladder resistors 45 and 46 as well as 55 and 56 are selected and installed for determining the upper and lower illumination limits which define or bracket the interval of acceptable illumination within the enclosed area. After the appropriate photosensitive detector 10 has been chosen and installed, the adjustable resistors 34 and 36 are balanced so as to provide a balanced output signal therefrom. Next, the mutual coupling between the first node and the second node of the bridge 30 is adjusted by varying the resistance present through potentiometer 60. The value of mutual coupling across the primary nodes of the bridge 30 is adjusted so as to: (1) limit the rate of change of the voltage at the first node V1 with respect to the voltage at the second node V2; and (2) adjust the effective operational sensitivity of the two voltage comparators 40 and 50 to correct the changes in non-linear operation of the photosensitive detector 10 in the levels of illumination near the lower level of illumination as compared with the sensitivity near the upper level of illumination.

Next, the variable resistor 102 is adjusted to designate the desired period of the clock signal from the variable clock 90. The period of the clock signal may be varied between several seconds at a minimum up to 90 minutes or more at a maximum. This period of the clock signal is adjusted to prevent the normal short variations in the level of natural illumination from triggering changes within the system. These short changes in natural illumination may be caused by the passage of clouds between the sun and the building, the presence of automobile reflections, other sources of artificial illumination within the building, and pedestrian traffic in areas adjacent to the photosensitive detector 10.

Thus, a first preferred embodiment of the automatic lighting control system in accordance with the present invention has been illustrated as an example of the invention as claimed. However, the present invention should not be limited in its application to the details illustrated in the accompanying drawings of the specification, since this invention may be practiced and constructed in a variety of different embodiments. Also, it must be understood that the terminology and descriptions employed herein are used solely for the purpose of describing the general operation of the preferred embodiments and therefore should not be construed as limitations on the operability of the invention.

We claim:

1. An illumination control apparatus for controlling the flow of electrical energy from a source thereof to a plurality of lighting modules for supplementing natural illumination so as to maintain a desired level of total illumination within an interior space, said illumination control apparatus comprising in combination:
   a plurality of power controllers each interposed between the source of electrical energy and one of the lighting modules, with each of said power controllers regulating the flow of electrical energy therethrough responsive to receiving a corresponding power control signal;
   a photosensitive detector for generating an illumination signal representative of the total effective level of natural and artificial illumination within the interior space;
   illumination limit means coupled to said photosensitive detector for generating an error signal at an output thereof responsive to said illumination signal deviating outside an acceptable illumination range defined between an upper illumination limit and a lower illumination limit;
   clock means for generating a periodic clock signal; and
   shift register means operatively coupled to said clock means, to said output of said illumination limit means and to each of said power controllers, with said shift register means for generating, responsive to receiving said clock signal and said error signal, appropriate ones of said power control signals so as to change the illumination of selected ones of the lighting modules, thereby adjusting the total illumination level to be within said acceptable illumination range.

2. The illumination control apparatus as described in claim 1 further comprising:
   first means operatively interposed between said photosensitive detector and said illumination limit means for reducing the rate of change of said illumination signal as said illumination signal approaches said lower illumination limit.

3. The illumination control apparatus as described in claim 1 further including:
   sensitivity means operatively interposed between said photosensitive detector and said illumination limit means for making said illumination limit means less sensitive to changes in said illumination signal near said lower illumination limit as compared with changes in said illumination signal near said upper illumination limit.

4. The illumination control apparatus as described in claim 3 wherein said illumination limit means comprises in combination:
   a bridge circuit having a signal leg which includes a first element in series with said photosensitive detector for defining a first node therebetween, with said bridge circuit also having a reference leg including a second element in series with a third element for defining a second node therebetween;
   an upper source for generating an upper limit signal representative of said upper illumination limit;
   a lower source for generating a lower limit signal representative of said lower illumination limit;
   a first voltage comparator having a first input coupled to said first node and having a second input coupled to said lower source, with said first voltage comparator generating at an output thereof a lower limit error signal responsive to said lower limit signal being greater than the signal at said first node; and
   a second voltage comparator having a first input coupled to said second node and having a second input coupled to said upper source, with said second voltage comparator generating at an output thereof an upper limit error signal responsive to the signal at said first node being greater than said upper limit signal.

5. The illumination control apparatus as described in claim 4 wherein said sensitivity means comprises an impedance element coupled between said first and second nodes of said bridge circuit for providing mutual coupling therebetween.

6. The illumination control apparatus as described in claim 4 wherein said first node is defined along a variable resistance coupled in series between said first element and said photosensitive detector in said signal leg of said bridge for providing a fine adjustment of the level of the signal therebetween; and wherein said second node is defined along a variable resistance coupled in series between said second and said third elements in said reference leg of said bridge for providing a fine adjustment of the level of the signal therebetween.

7. The illumination control apparatus as described in claim 1 further including sampling means interposed between said output of said illumination means and said shift register means, said sampling means for periodically sensing for the presence of said error signal at both ends of a time period determined by said clock signal and responsive to receiving error signals at two consecutive samples transmitting said error signals to said shift register means.

8. The illumination control apparatus as described in claim 7 wherein said sampling means comprises in combination:
   first memory means having inputs operatively coupled to said illumination limit means and to said clock means for sampling and holding said error signal at an output thereof responsive to receiving a first one of said clock signals;
   second memory means having inputs operatively coupled to said illumination limit means and to said clock means for sampling and holding said error signal at an output thereof responsive to receiving a second one of said clock signals; and
   logic means having inputs coupled to said outputs of said first and second memory means for generating said error signals at said output thereof responsive to receiving said clock signal at a time when said outputs of both first and second memory means show said error signal.

9. The illumination control apparatus as described in claim 7 wherein said illumination limit means is located remotely from said photosensitive detector and from said sampling means.

10. The illumination control apparatus as described in claim 9 wherein each of said power controllers is spaced from said sampling means and is attached to the corresponding one of the lighting modules controlled thereby.

11. The illumination control apparatus as described in claim 9 which is adapted for use with existing lighting systems of the type employing on/off switches, located within the enclosed area, which are coupled by high power electrical conductors to the various lighting modules, wherein said sensitivity means and said illumination limit means are mounted within the junction box formerly occupied by the on/off switch and are coupled to one end of the high power electrical conductor which has been decoupled from the on/off switch.

12. The illumination control apparatus as described in claim 10 wherein said sampling means is located adjacent to the lighting modules and coupled to another end of the high power electrical conductor which has been decoupled from the lighting modules.

13. The illumination control apparatus as described in claim 11 wherein said error signals have an amplitude of less than 15 Volts peak to peak.

* * * * *